US00RE35522E

United States Patent [19]

Holliday

[11] E Patent Number: Re. 35,522

[45] **Reissued Date of Patent: *Jun. 3, 1997**

[54] STEEL RULE DIE RETAINING BOARD AND DIE LOCK

[75] Inventor: Ken Holliday, Decatur, Ga.

[73] Assignee: Southeastern Die Company, Inc., Decatur, Ga.

[ * ] Notice: The portion of the term of this patent subsequent to Feb. 7, 2010, has been disclaimed.

[21] Appl. No.: 412,908

[22] Filed: Mar. 29, 1995

Related U.S. Patent Documents

Reissue of:

[64] Patent No.: 5,197,367
Issued: Mar. 30, 1993
Appl. No.: 771,238
Filed: Oct. 4, 1991

[51] Int. Cl.[6] ..... B26D 7/26

[52] U.S. Cl. ..... 83/698.31; 83/694; 83/698.91; 403/155; 403/409.1

[58] Field of Search ..... 83/698.31, 699.11, 83/673, 694, 128; 403/351, 352, 354, 356, 513, 522, 525; 76/107.8, 107.4; 493/354, 372, 468

[56] References Cited

U.S. PATENT DOCUMENTS

| | | |
|---|---|---|
| 1,766,244 | 6/1930 | Cumfer . |
| 2,821,871 | 2/1958 | Sarno . |
| 3,036,478 | 5/1962 | Scott et al. . |
| 3,115,805 | 12/1963 | Engelmann . |
| 3,530,750 | 9/1970 | Daniels . |
| 3,826,170 | 7/1974 | Jones et al. . |
| 3,835,746 | 9/1974 | Young, Jr. et al. . |
| 3,863,550 | 2/1975 | Sarka et al. . |
| 3,941,038 | 3/1976 | Bishop . |
| 4,052,886 | 10/1977 | Buick . |
| 4,360,168 | 11/1982 | Peterson, Jr. . |
| 4,848,202 | 7/1989 | Crampton . |
| 4,923,350 | 5/1990 | Hinksman et al. . |
| 5,029,505 | 7/1991 | Holliday . |
| 5,138,923 | 8/1992 | Kent et al. . |

*Primary Examiner*—Rinaldi I. Rada
*Assistant Examiner*—Allan M. Schrock
*Attorney, Agent, or Firm*—Watson Cole Stevens Davis, P.L.L.C.

[57] ABSTRACT

An apparatus is provided for improved retention of steel rule dies inserted into die slots of a retaining board. A plurality of lock slots are oriented substantially perpendicularly to the direction of insertion and have open faces to permit communication with the die slots. A kerf lock is located within each lock slot and extends into the die slot until a die is inserted into the die slot. Upon initial insertion of a die into the die slot, the kerf lock compresses. Once the die is competely inserted, the kerf lock exerts a normal force against the die in the direction of the die slot wall opposite the open face. An inserted steel rule die is securely held within the die slot.

27 Claims, 2 Drawing Sheets

STEEL RULE DIE RETAINING BOARD AND DIE LOCK

Matter enclosed in heavy brackets [ ] appears in the original patent but forms no part of this reissue specification; matter printed in italics indicates the additions made by reissue.

BACKGROUND OF THE INVENTION

1. Technical Field of the Invention

The present invention relates generally to retaining boards and more particularly to locks for holding steel rule dies of varying widths within a die rule slot of a retaining board.

2. Background Art

Steel rule dies are widely used to cut a variety of materials such as cardboard and plastics into a desired shape. Often, the steel rule dies are pressure inserted into slots located in a board of wood or other suitable material. During operation of the cutter, these dies often become loosened and ultimately disengaged, thereby necessitating costly and time consuming interruption of the cutting process as repairs are undertaken. In addition, the slots are of varying widths to accommodate dies of varying widths, thus making standardization difficult.

Several attempts have been made to prevent this loosening of the steel rule dies. For example, U.S. Pat. No. 4,052,886 discloses a solid base material having caverns which are filled with semi-rigid filler material to anchor an inserted steel die. However, this method requires time-consuming filling and the ultimate strength of securing is dependant on the filler material selected. U.S. Pat. No. 3,941,038 discloses the use of S-wall shaped resilient members which pin the rule between itself and packing shims. This apparatus necessitates a difficult insertion of the rule between the resilient member and shims. A third proposal is shown in U.S. Pat. No. 3,835,746. A resilient support and spring are deformed upon insertion of the die and thereafter exert an upward force against the die to secure it in a slot. Such a deformation ultimately leads to mechanical failure of the retaining system as the dies are continuously replaced.

U.S. Pat. No. 5,029,505 discloses an apparatus for improved retention of steel rule dies inserted into slots of a retaining board. A plurality of housings, each having a spring and ball assembly, are inserted into chambers of a retaining board. The balls bias a die rule in an associated slot such that the rule is securely, yet removably, held in the slot. The apparatus is complex, however, expensive to manufacture, and requires large chambers to be cut into the retaining board. Manufacturing the spring and ball assembly inside the housing is also a complicated task.

SUMMARY OF THE INVENTION

It is an object of the present invention to provide an apparatus which securely retains steel rule dies in a retaining board.

It is a further object of the present invention to accomplish the foregoing object without difficult insertion of the apparatus or the steel rule die.

It is yet another object of the present invention to accomplish the preceding objects imply and economically.

It is a still further object of the present invention to achieve the foregoing objects with an apparatus which is durable and long lasting.

It is another object of the present invention to achieve the above objects for steel rule dies of varying widths.

Other objects and advantages will be apparent from the specification and drawings which follow.

The foregoing and additional objects are obtained by an apparatus according to the present invention for securing steel rule die holders resorted in associated slots located in a retaining board. The apparatus includes at least one narrow chamber located adjacent to each slot and having an open face opening towards the slot. The chamber is oriented substantially perpendicularly to the direction of insertion of the die. A means for urging the inserted die normally towards a wall of the slot is located opposite the open face of the chamber and is positioned within the chamber. Accordingly, the die is securely held within the slot upon insertion.

DETAILED DESCRIPTION OF THE PREFERRED EMBODIMENTS

Figure 1:
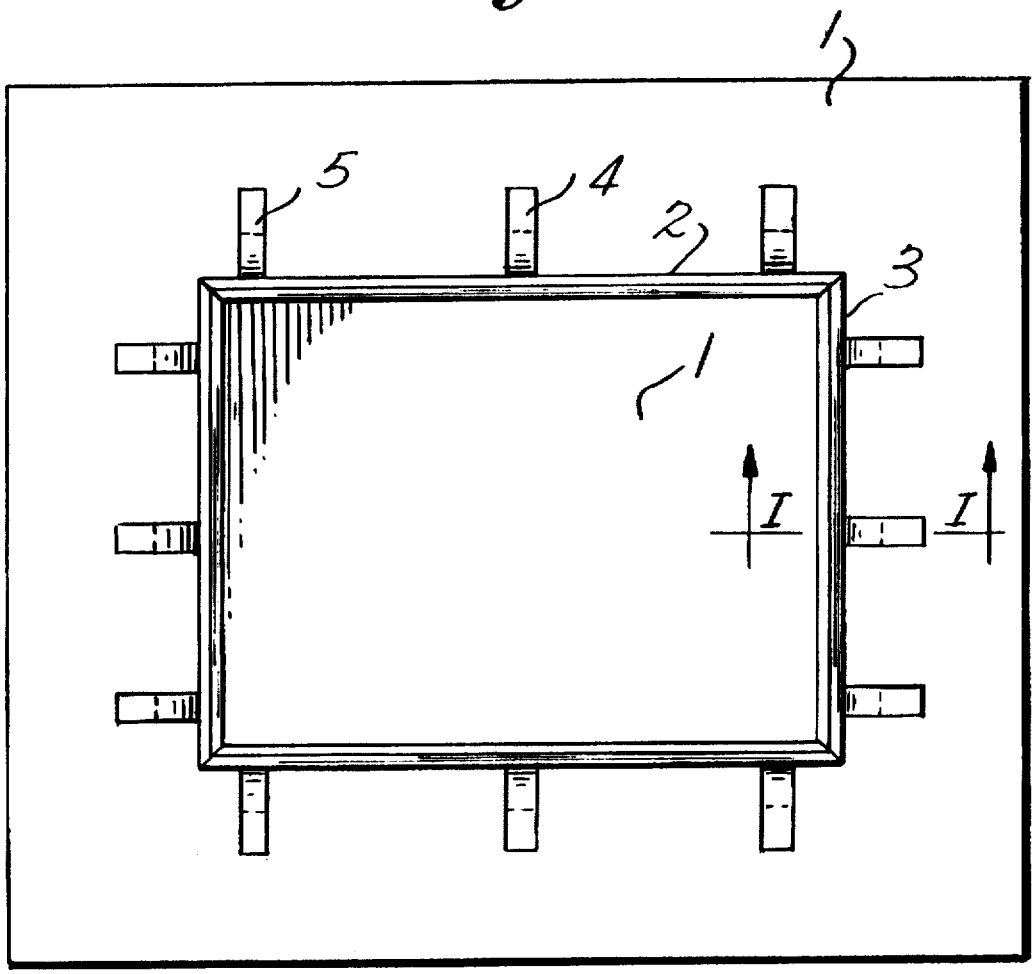
FIG. 1 is a top view of a steel rule die retaining board according to the present invention having slots wherein urging means according to the invention are disposed.
Figure 2:
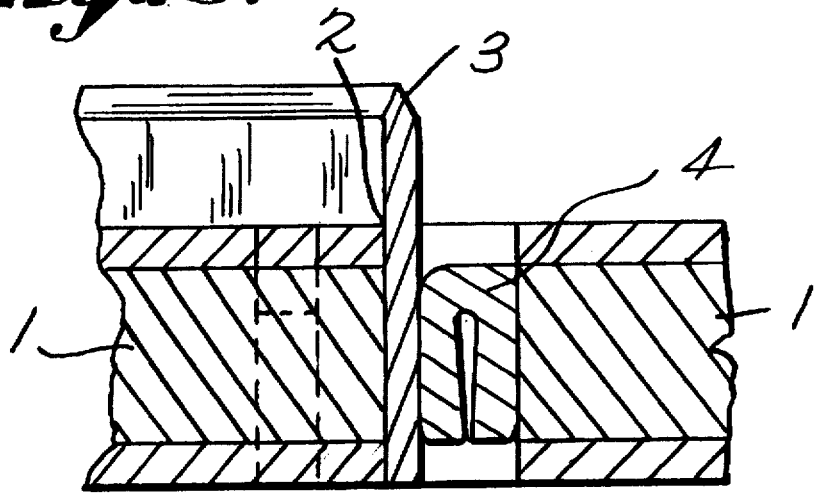
FIG. 2 is a sectional view of the die holder and urging means of the present invention taken along line I—I of FIG. 1.

The present invention will now be described in greater detail with reference to the accompanying drawings. Referring to FIGS. 1 and 2, a retaining board 1 comprising wood, plastic or other suitable material is provided with a plurality of die slots 2. The die slots 2 may be formed by any conventional apparatus such as a laser beam or a jig saw. Steel rule dies 3 are provided which have a width which is slightly less than the width of the die slots. Accordingly, a steel rule die 3 may be inserted into an associated die slot.

To prevent the inserted die 3 from loosening within the die slot 2, an apparatus according to the present invention is provided. An urging means 4, herein referred to as a kerf lock, is provided within lock slots 5 adjacent to the die slots 2 in a predetermined fashion. Lock slots 5 are in communication with die slots 2 via an open face. As will be apparent to one skilled in the art from the present application, the number and locations of the kerf locks and associated lock slots are determined by considering such factors as optimum securing of the inserted dies, configuration of the die rule, and manufacturing costs.

Figure 3:
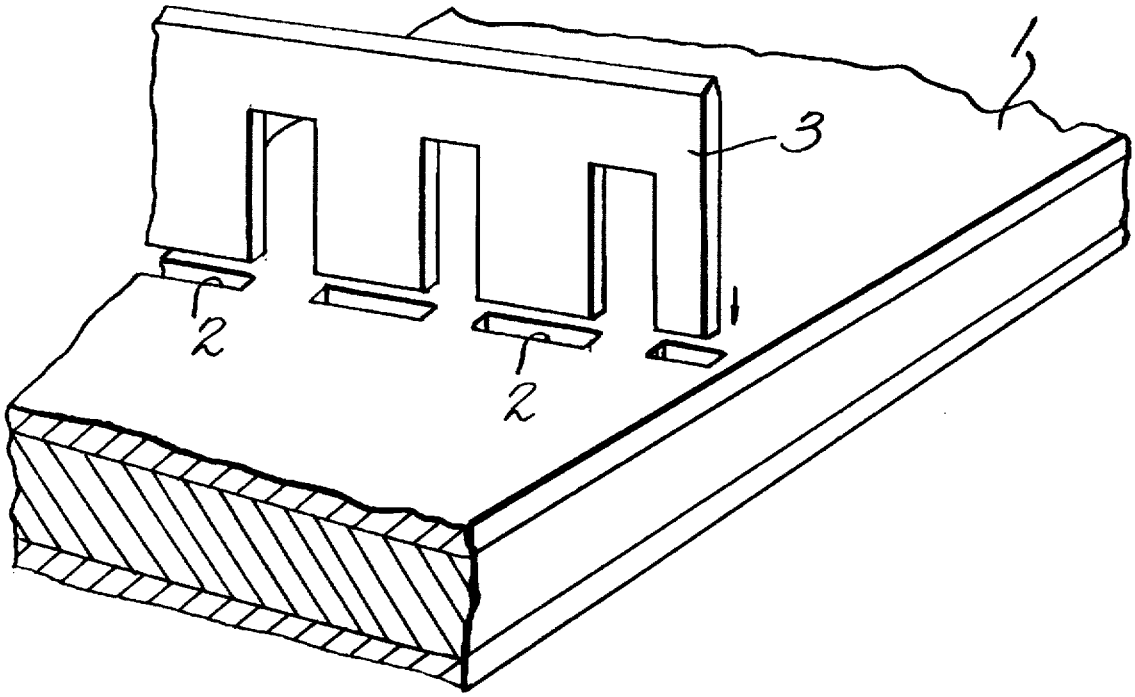
FIG. 3 shows the die rule before it is inserted into the die slots.

FIG. 3 shows the die rule 3 before it is inserted into the die slot 2. The die slot 2 is not continuous as a continuous slot would weaken the retaining board. The die rule has recesses which enable the rule to bridge the retaining board between cut die slots.

The kerf lock is preferably of a unitary construction and can be easily injection molded. The kerf lock comprises two arms connected by a bridge at one end and separated by a distance at the other end. The kerf lock is generally n-shaped.

When the kerf lock is disposed within a lock slot of the retaining board, one arm rests against the retaining board while the other arm has a force transmitting surface face which extends into the die slot. When a die rule is inserted into the die slot, the force transmitting arm, or resilient arm, is forced in a direction toward the resting or support arm. This creates a spring-type force such that the force transmitting surface of the force transmitting arm exerts a pressure against the die rule which secures the die rule in the die slot. While a sufficient pressure is applied to hold the die rule, the rule may be pulled out of the die slot with pair of pliers, preferably Channel Locks®. No disassembly of the look or retaining board is necessary to pull out the die rule. The number of kerf looks can be varied to supply greater or lesser pressure to hold the die rule in the die slot.

The kerf lock may be manufactured by various methods which may include stamping or injection molding. The kerf lock preferably comprises a plastic. Most preferably, the kerf look is injection molded of Teflon® which provides a rigid, long lasting article which does not lose its elasticity over its lifetime.

Figure 4:
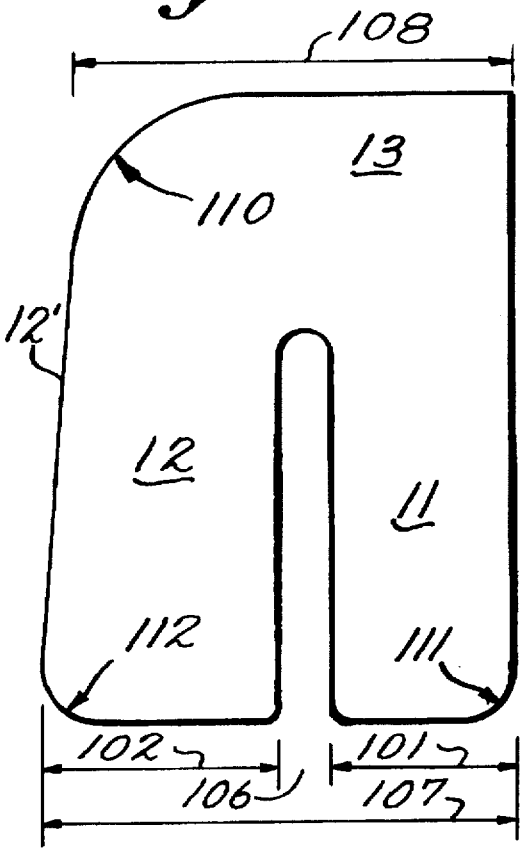
FIG. 4 is a side view of the kerf lock.
Figure 5:
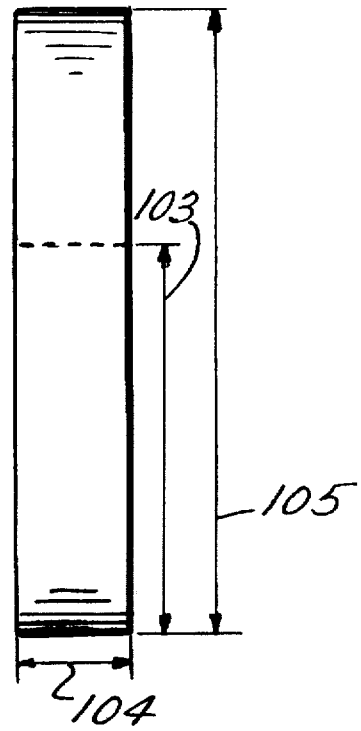
FIG. 5 is an end view of the kerf lock.

As best seen in FIGS. 4 and 5, the kerf look has two arms, a support arm 11 and a resilient arm 12. The two arms are connected at their top ends by a bridge 13. The support arm 11 is generally rectangular, having a width 101 which is generally constant from the bottom of the arm to the top. The resilient arm 12 narrows in width 102 from the bottom of the arm toward the top of the arm.

Both arms have the same height 103 and the same thickness 104. The entire height 105 of the kerf look is about 50 to 75 percent more than the height of the arms, the added height being attributed to the height of the bridge 13.

The support arm 11 and the resilient arm 12 are separated normally by a separation gap 106 which is constant from the lower most portions of the arms to the top portions of the arms. When in use, a die rule forces the resilient arm 12 toward the support arm 11 at the bottom portion of the resilient arm due to the widening of the resilient arm from its top portion to the bottom portion. The bottom portion of the resilient arm normally extends into the die slot and is moved toward the lock slot upon insertion of a die rule. This causes the separation gap 106 to be less between the bottom portions of the two arms than at their top portions, when in use. Normally, when not in use, the kerf look has an entire width 107 at the bottom end. The width 108 of the kerf look at the upper end where the arms meet the bridge is slightly less than the bottom width 107.

To provide a rigid yet resilient kerf look having an even stress distribution when in use, the two arms and the bridge intersect in a smooth curve such as a semi-circle. This prevents stress fractures which my occur in intersections having corners.

To facilitate the insertion of the die rule into a die slot of a retaining board according to the present invention, a smoothly curved surface is provided on the kerf lock at the bridge where initial contact is made with the die rule. The curved surface is continuous with the force transmitting surface 12' of the resilient arm 12. The curved surface preferably has a radius of curvature 110 which is between about 0.10 and 0.15 inches.

To facilitate insertion of the kerf lock into a lock slot of a retaining board, both arms have a rounded corner at their bottom portions which corners are opposite the two corners separated by and adjacent the separation gap 106. The rounded corner of the support arm has a radius of curvature 111 and the rounded corner of the resilient arm has a radius of curvature 112.

Table 1 below shows the relationship between the various dimensions of the kerf lock according to four preferred embodiments.

TABLE 1

| | DIMENSIONS | | | | | | | | | |
|---|---|---|---|---|---|---|---|---|---|---|
| | 103 | 105 | 107 | 106 | 101 | 108 | 110 | 112 | 111 | 104 |
| I | 0.25000 | 0.37400 | 0.27300 | 0.05900 | 0.08900 | 0.23900 | 0.12500 | 0.03125 | 0.03125 | 0.12500 |
| II | 0.31250 | 0.43700 | 0.27300 | 0.05900 | 0.08900 | 0.24100 | 0.12500 | 0.03125 | 0.03125 | 0.12500 |
| III | 0.50000 | 0.62500 | 0.27300 | 0.05900 | 0.08900 | 0.24400 | 0.12500 | 0.03125 | 0.03125 | 0.12500 |
| IV | 0.50000 | 0.71800 | 0.27300 | 0.05900 | 0.08900 | 0.24500 | 0.12500 | 0.03125 | 0.03125 | 0.12500 |

The present invention thus prevents down time associated with loose dies. The described apparatus securely holds the dies in a simple, efficient and economic manner. Also, the kerf lock is very durable and can secure dies of varying widths in the slots.

It is to understood that further modifications, deletions, substitutions and additions to the invention will become apparent to one skilled in the art without departing from the spirit and scope of the present invention as defined in the following claims.

I claim:

1. In combination, a retaining board having formed therein an elongated die slot including opposite sides, a lock slot intersecting one side of said die slot, a die disposed within said die slot, and a die lock disposed within said lock slot and engaging said die to resiliently urge said die into engagement with the other side or the die slot to maintain the die in operative position, wherein said die lock comprises a generally n-shaped member having a support arm and a resilient arm each of which has a top portion and a bottom portion, said support arm and said resilient arm being connected at the top portions by a bridge to resiliently support said resilient arm from said support arm for movement of said resilient arm toward and away from said support arm, said resilient arm having a dimension perpendicular to said die slot which dimension narrows from the bottom portion of said resilient arm towards the bridge of said die lock, said resilient arm contacting said die when said die is in said die slot so that said resilient arm is displaced toward said support arm, said resilient arm extending into said die slot upon removal of said die from said die slot.

2. In combination, a retaining board having formed therein an elongated die slot including opposite sides, a lock slot intersecting one side of said die slot, a die disposed within said die slot, and a die lock disposed within said lock slot and engaging said die to resiliently urge said die into engagement with the other side of the die slot to maintain the die in operative position, wherein said die lock comprises a generally n-shaped member having a support arm and a resilient arm each of which has a top portion and n bottom portion, said support arm and said resilient arm being connected at the top portions by a bridge to resiliently support said resilient arm from said support arm for movement of said resilient arm toward and away from said support arm, and wherein there is a separation gap between said resilient arm and said support arm, said gap narrowing from the top portions of said arms adjacent the bridge toward the bottom portions of said arms when the resilient arm contacts the die in the die slot, said resilient arm contacting said die when said die is in said die slot so that said resilient arm is displaced toward said support arm, said resilient arm extending into said die slot upon removal of said die from said die slot.

3. In combination, a retaining board having formed therein an elongated die slot, an elongated lock slot intersecting said die slot and extending perpendicular to said die slot, a die disposed within said die slot, and a die lock disposed within said lock slot and engaging said die to maintain the die in operative position wherein said die lock comprises a generally n-shaped member having a support arm and a resilient arm each of which has a top portion and a bottom portion, said support arm and said resilient arm being connected at the top portions by a bridge to resiliently support said resilient arm from said support arm for movement of said resilient arm toward and away from said support arm, said resilient arm having a dimension perpendicular to said die slot which dimension narrows from the bottom portion of said resilient arm towards the bridge of said die lock, said resilient arm contacting said die when said die is in said die slot so that said resilient arm is displaced toward said support arm, and said resilient arm extending into said die slot upon removal of said die from said die slot.

4. In combination, a retaining board having formed therein an elongated die slot, an elongated lock slot intersecting said die slot and extending perpendicular to said die slot, a die disposed within said die slot, and a die lock disposed within said lock slot and engaging said die to maintain the die in operative position wherein said die lock comprises a generally n-shaped member having a support arm and a resilient arm each of which has a top portion and a bottom portion, said support arm and said resilient arm being connected at the top portions by a bridge to resiliently support said resilient arm from said support arm for movement of said resilient arm toward and away from said support arm, and wherein there is a separation gap between said resilient arm and said support arm, said gap narrowing from the top portions of said arms adjacent the bridge toward the bottom portions of said arms when the resilient arm contacts the die in the die slot, said resilient arm contacting said die when said die is in said die slot so that said resilient arm is displaced toward said support arm, and said resilient arm extending into said die slot upon removal of said die from said die slot.

5. In combination, a retaining board having formed therein an elongated die slot, a lock slot intersecting said die slot, a die disposed within said die slot, and a die lock disposed within said lock slot and engaging said die to maintain the die inoperative position, said die lock having a width, a thickness and a depth, said width having a dimension extending perpendicular to said die slot, said thickness having a dimension extending parallel to said die slot, and said dimension of width being greater than said dimension of thickness, said resilient arm having a dimension perpendicular to said die slot which dimension narrows from the bottom portion of said resilient arm towards the bridge of said die lock, wherein said die lock comprises a generally n-shaped member having a support arm and a resilient arm each of which has a top portion and a bottom portion, said support arm and said resilient arm being connected at the top portions by a bridge to resiliently support said resilient arm from said support arm for movement of said resilient arm towards and away from said support arm, said resilient arm contacting said die when said die is in said die slot so that said resilient arm is displaced toward said support arm, said resilient arm extending into said die slot upon removal of said die from said die slot.

6. In combination, a retaining board having formed therein an elongated die slot, a lock slot intersecting said die slot, a die disposed within said die slot, and a die lock disposed within said lock slot and engaging said die to maintain the die in operative position, said die lock having a width, a thickness and a depth, said width having a dimension extending perpendicular to said die slot, said thickness having a dimension extending parallel to said die slot, and said dimension of width being greater than said dimension of thickness, wherein there is a separation gap between said resilient arm and said support arm, said gap narrowing from the top portions of said arms adjacent the bridge toward the bottom portions of said arms when the resilient arm contacts the die in the die slot, and wherein said die lock comprises a generally n-shaped member having a support arm and a resilient arm each of which has a top portion and a bottom portion, said support arm and said resilient arm being connected at the top portions by a bridge to resiliently support said resilient arm from said support arm for movement of said resilient arm toward and away from said support arm, said resilient arm contacting said die when said die is in said die slot so that said resilient arm is displaced toward said support arm, said resilient arm extending into said die slot upon removal of said die from said die slot.

*7. In combination, a retaining board having formed therein an elongated die slot having a length and height and including opposite sides, said retaining board having formed therein a lock slot intersecting one side of said die slot to provide an opening having a first dimension extending parallel with the length of said die slot and having a second dimension extending parallel with the height of said die slot, said first dimension being a fraction of the length of said die slot, said second dimension being substantially identical with the height of said die slot, a die disposed within said die slot, and a die lock disposed within said lock slot, said lock slot having a length, said die lock being formed of resilient material and having a dimension extending parallel with the length of said lock slot such that the die lock extends through said opening into the die slot in the absence of the die and being deformed by the die in the slot so that the die lock resiliently engages and urges said die into engagement with the other side of the die slot to maintain the die in operative position, said die slot and said lock slot being in a permanently fixed relationship to one another during insertion and during removal of said die from said die slot so that said die lock remains in said lock slot during insertion and during removal of said die from said die slot.*

*8. A combination as defined in claim 7, wherein said die lock resiliently engages and urges said die into engagement with the other side of the die slot directly opposite to said lock slot to maintain the die in operative position.*

*9. A combination as defined in claim 7, wherein said die lock comprises a generally n-shaped member having a support arm and a resilient arm each of which has a top portion and a bottom portion, said support arm and said resilient arm being connected at said top portion of each arm by a bridge to resiliently bias said resilient arm toward and away from said support arm, said resilient arm contacting said die when said die is in said die slot so that said resilient arm is displaced towards said support arm, the*

*displacement of said resilient arm providing a force which said resilient arm exerts on said die to force said die against a wall of the die slot opposite the lock slot, whereby the die is securely held within the die slot upon die insertion, said resilient arm extending into said die slot upon removal of said die from said die slot.*

*10. A combination as defined in claim 7, wherein said retaining board has opposite faces, said die lock having an upper surface and a lower surface, said upper surface being spaced from one of said opposite faces and said lower surface being spaced from the other of said opposite faces.*

*11. A combination as defined in claim 7, wherein said die lock comprises a plastic material.*

*12. A combination as defined in claim 9, wherein said die lock comprises a plastic material.*

*13. A combination as defined in claim 7, wherein said retaining board has a plurality of lock slots intersecting said die slot and a die lock disposed within each of said lock slots.*

*14. In combination, a retaining board having formed therein an elongated die slot having a length and height and including opposite sides, said retaining board having formed therein a lock slot intersecting one side of said die slot to provide an opening having a first dimension extending parallel with the length of said die slot and having a second dimension extending parallel with the height of said die slot, said first dimension being a fraction of the length of said die slot, said second dimension being substantially identical with the height of said die slot, a die disposed within said die slot, and a die lock disposed within said lock slot, said lock slot having a length, said die lock being formed of resilient material and having a dimension extending parallel with the length of said lock slot such that the die lock extends through said opening into the die slot in the absence of the die and being deformed by the die in the slot so that the die lock resiliently engages and urges said die into engagement with the other side of the die slot to maintain the die in operative position, said die slot and said lock slot being in a permanently fixed relationship to one another during insertion and during removal of said die from said die slot so that said die lock remains in said lock slot during insertion and during removal of said die from said die slot, said lock slot including opposite side surfaces and an end surface, said side surfaces being generally parallel with one another and perpendicular to said die slot and said end surface, said side surfaces having substantially greater dimension in a direction perpendicular to said die slot than the dimension of said end surface in a direction parallel to said die slot.*

*15. A combination as defined in claim 14, wherein said die lock resiliently engages and urges said die into engagement with the other side of the die slot directly opposite to said lock slot to maintain the die in operative position.*

*16. A combination as defined in claim 14, wherein said die lock comprises a generally n-shaped member having a support arm and a resilient arm each of which has a top portion and a bottom portion, said support arm and said resilient arm being connected at said top portion of each arm by a bridge to resiliently bias said resilient arm toward and away from said support arm, said resilient arm contacting said die when said die is in said die slot so that said resilient arm is displaced towards said support arm, the displacement of said resilient arm providing a force which said resilient arm exerts on said die to force said die against a wall of the die slot opposite the lock slot, whereby the die is securely held within the die slot upon die insertion, said resilient arm extending into said die slot upon removal of said die from said die slot.*

*17. A combination as defined in claim 14, wherein said retaining board has opposite faces, said die lock having an upper surface and a lower surface, said upper surface being spaced from one of said opposite faces and said lower surface being spaced from the other of said opposite faces.*

*18. A combination as defined in claim 14, wherein said die lock comprises a plastic material.*

*19. A combination as defined in claim 16, wherein said die lock comprises a plastic material.*

*20. A combination as defined in claim 14, wherein said retaining board has a plurality of lock slots intersecting said die slot and a die lock disposed within each of said lock slots.*

*21. In combination, a retaining board having formed therein an elongated die slot having a length and height and including opposite sides, said retaining board having formed therein a lock slot intersecting one side of said die slot to provide an opening having a first dimension extending parallel with the length of said die slot and having a second dimension extending parallel with the height of said die slot, said first dimension being a fraction of the length of said die slot, said second dimension being substantially identical with the height of said die slot, a die disposed within said die slot, and a die lock disposed within said lock slot and having a top end and a bottom end, said lock slot having a length, said die lock being formed of resilient material and having a dimension extending parallel with the length of said lock slot such that the die lock extends through said opening into the die slot in the absence of the die and being deformed by the die in the slot so that the die lock resiliently engages and urges said die into engagement with the other side of the die slot to maintain the die in operative position, said die slot and said lock slot being in a permanently fixed relationship to one another during insertion and during removal of said die from said die slot so that said die lock remains in said lock slot during insertion and during removal of said die from said die slot, said lock slot including opposite side surfaces and an end surface, said side surfaces being generally parallel with one another and perpendicular to said die slot and said end surface, said side surfaces of said lock slot having a fixed dimension extending laterally of said die slot, said side surfaces having substantially greater dimension in a direction perpendicular to said die slot than the dimension of said end surface in a direction parallel to said die slot, said die lock having a first end surface engaging the end surface of said lock slot and a second end surface which would extend through said opening into the die slot in the absence of the die.*

*22. A combination as defined in claim 21, wherein said die lock resiliently engages and urges said die into engagement with the other side of the die slot directly opposite to said lock slot to maintain the die in operative position.*

*23. A combination as defined in claim 21, wherein said die lock comprises a generally n-shaped member having a support arm and a resilient arm each of which has a top portion and a bottom portion, said support arm and said resilient arm being connected at said top portion of each arm by a bridge to resiliently bias said resilient arm toward and away from said support arm, said resilient arm contacting said die when said die is in said die slot so that said resilient arm is displaced towards said support arm, the displacement of said resilient arm providing a force which said resilient arm exerts on said die to force said die against a wall of the die slot opposite the lock slot, whereby the die is securely held within the die slot upon die insertion, said resilient arm extending into said die slot upon removal of said die from said die slot.*

*24. A combination as defined in claim 21, wherein said retaining board has opposite faces, said die lock having an upper surface and a lower surface, said upper surface being spaced from one of said opposite faces and said lower surface being spaced from the other of said opposite faces.*

*25. A combination as defined in claim 21, wherein said die lock comprises a plastic material.*

*26. A combination as defined in claim 23, wherein said die lock comprises a plastic material.*

*27. A combination as defined in claim 21, wherein said retaining board has a plurality of lock slots intersecting said die slot and a die lock disposed within each of said lock slots.*

* * * * *